United States Patent
Kolodziej

(10) Patent No.: US 9,162,574 B2
(45) Date of Patent: Oct. 20, 2015

(54) IN-VEHICLE TABLET

(75) Inventor: Kris Kolodziej, Hoboken, NJ (US)

(73) Assignee: Cellco Partnership, Basking Ridge, NJ (US)

(*) Notice: Subject to any disclaimer, the term of this patent is extended or adjusted under 35 U.S.C. 154(b) by 101 days.

(21) Appl. No.: 13/332,016

(22) Filed: Dec. 20, 2011

(65) Prior Publication Data
US 2013/0157647 A1 Jun. 20, 2013

(51) Int. Cl.
*H04M 3/00* (2006.01)
*B60K 35/00* (2006.01)
*H04W 4/04* (2009.01)
*H04M 1/725* (2006.01)
*B60K 37/06* (2006.01)
*H04L 29/08* (2006.01)
*H04M 1/60* (2006.01)
*G08G 1/0967* (2006.01)
*G08G 1/16* (2006.01)

(52) U.S. Cl.
CPC ............ *B60K 35/00* (2013.01); *B60K 37/06* (2013.01); *H04M 1/7253* (2013.01); *H04M 1/72522* (2013.01); *H04W 4/046* (2013.01); *B60K 2350/1032* (2013.01); *B60K 2350/906* (2013.01); *G08G 1/096716* (2013.01); *G08G 1/096741* (2013.01); *G08G 1/096775* (2013.01); *G08G 1/167* (2013.01); *H04L 67/12* (2013.01); *H04M 1/6091* (2013.01); *H04M 2250/02* (2013.01); *H04M 2250/06* (2013.01); *H04M 2250/10* (2013.01)

(58) Field of Classification Search
CPC ............ H04M 1/6075; H04M 1/6083; H04M 1/6091; H04M 1/72522; H04M 1/7253; H04M 1/7257; H04M 1/72577; H04M 2250/02

USPC ............ 455/3.06, 41.2, 99, 238.1, 345, 455/418–420, 569.2; 340/429, 340/426.11–426.36, 438, 436, 461, 340/539.1–539.2, 10.2–10.32; 379/37, 40, 379/45, 51, 142.1, 201.01, 203.01, 218.02, 379/265.01, 260–267, 308, 321, 448
See application file for complete search history.

(56) References Cited

U.S. PATENT DOCUMENTS

| | | | |
|---|---|---|---|
| 2006/0036356 A1* | 2/2006 | Rasin et al. | 701/1 |
| 2007/0224937 A1* | 9/2007 | Jung et al. | 455/41.2 |
| 2008/0046172 A1* | 2/2008 | Ames et al. | 701/208 |
| 2008/0261643 A1* | 10/2008 | Bauer et al. | 455/517 |
| 2009/0251409 A1* | 10/2009 | Parkinson et al. | 345/156 |

(Continued)

OTHER PUBLICATIONS

"Welcome to Entune", http://www.toyota.com/entune/what-is-entune/, pp. 1-2, Accessed on Dec. 16, 2011.

(Continued)

*Primary Examiner* — Vladimir Magloire
*Assistant Examiner* — Erica Navar

(57) ABSTRACT

A portable telematics device can be a tablet or a mobile device. The tablet and mobile device can combine to run applications via a communication link and form a link with a vehicle and/or another mobile device. The tablet can also have a telematics component which has a display component displaying a selected program icon from the mobile station on the tablet and a control component. The control component can be configured to prevent a use of all program icons on the mobile station. Further, it can allow a use of the selected program icon on the tablet, which can activate a related program on the mobile station. The display component can display at least an output of the related program on the tablet.

25 Claims, 11 Drawing Sheets

(56) References Cited

U.S. PATENT DOCUMENTS

| | | | | |
|---|---|---|---|---|
| 2009/0284476 A1* | 11/2009 | Bull et al. | ..................... | 345/173 |
| 2010/0159909 A1* | 6/2010 | Stifelman | | |
| 2011/0053506 A1* | 3/2011 | Lemke et al. | ................ | 455/41.2 |
| 2011/0065456 A1* | 3/2011 | Brennan et al. | ............ | 455/456.4 |
| 2011/0093154 A1* | 4/2011 | Moinzadeh et al. | ............ | 701/29 |
| 2011/0099392 A1* | 4/2011 | Conway | ........................ | 713/300 |
| 2011/0105097 A1* | 5/2011 | Tadayon et al. | ............... | 455/418 |
| 2011/0301839 A1* | 12/2011 | Pudar et al. | ................... | 701/202 |
| 2012/0165071 A1* | 6/2012 | Hsu et al. | ...................... | 455/557 |
| 2012/0282914 A1* | 11/2012 | Alexander | ................... | 455/420 |

OTHER PUBLICATIONS

"The Cruze Eco Offers 42 HWY MPG by sacrificing nothing", 2012, pp. 1-5, The 2012 Chevrolet Cruze product literature.
"Sync I Features for SYNC: See all SYNC Voice-Activated Options & Learn How to Customize SYNC I Ford.com", http://www.ford.com/technology/sync/features/, pp. 1-4, Accessed on Dec. 16, 2011.
"R-Link", Renault.com, http://www.renault.com/en/innovation/plaisir-et-confort/pages/r-link.aspx, pp. 1-2, Accessed on Dec. 16, 2011.

* cited by examiner

FIG. 1
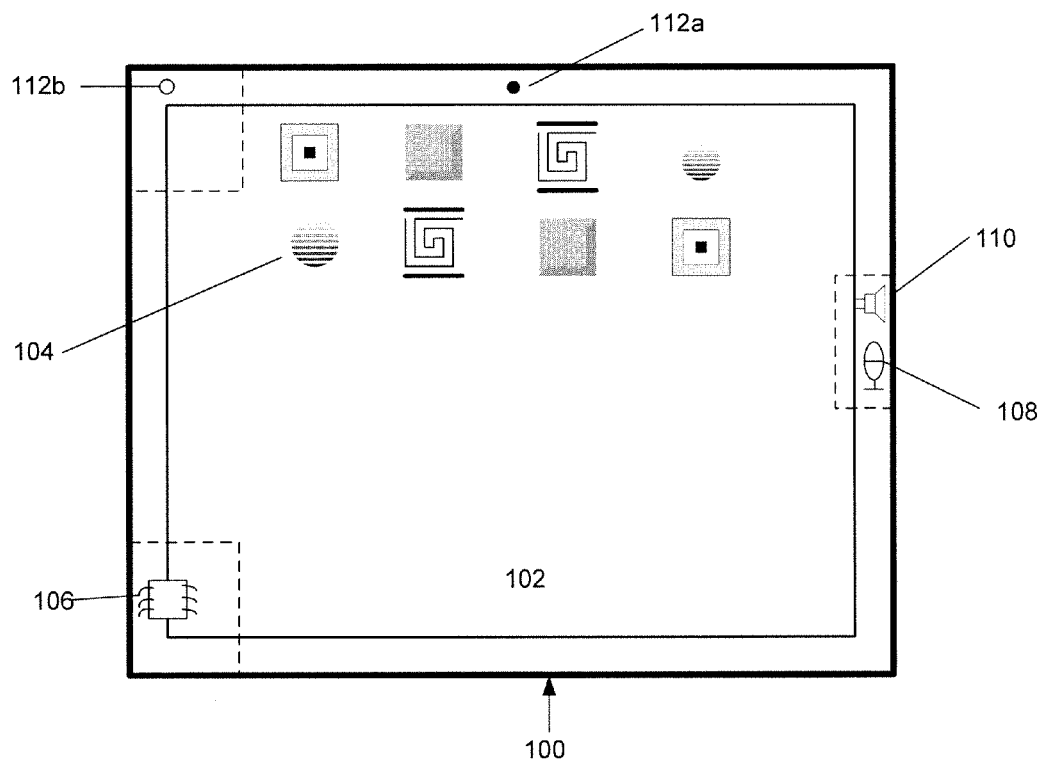
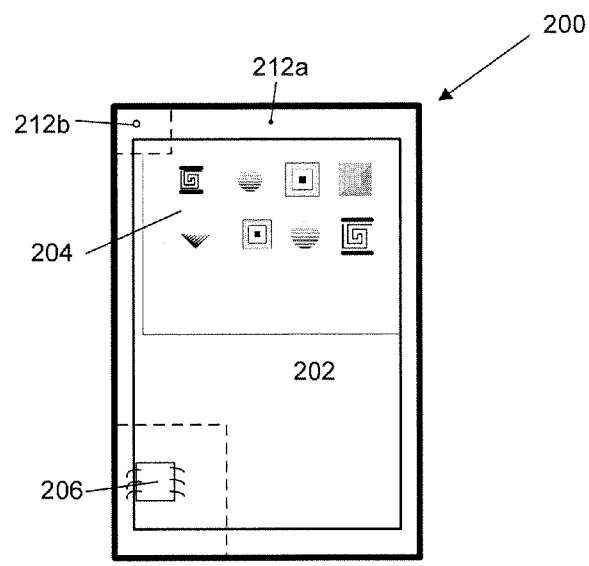

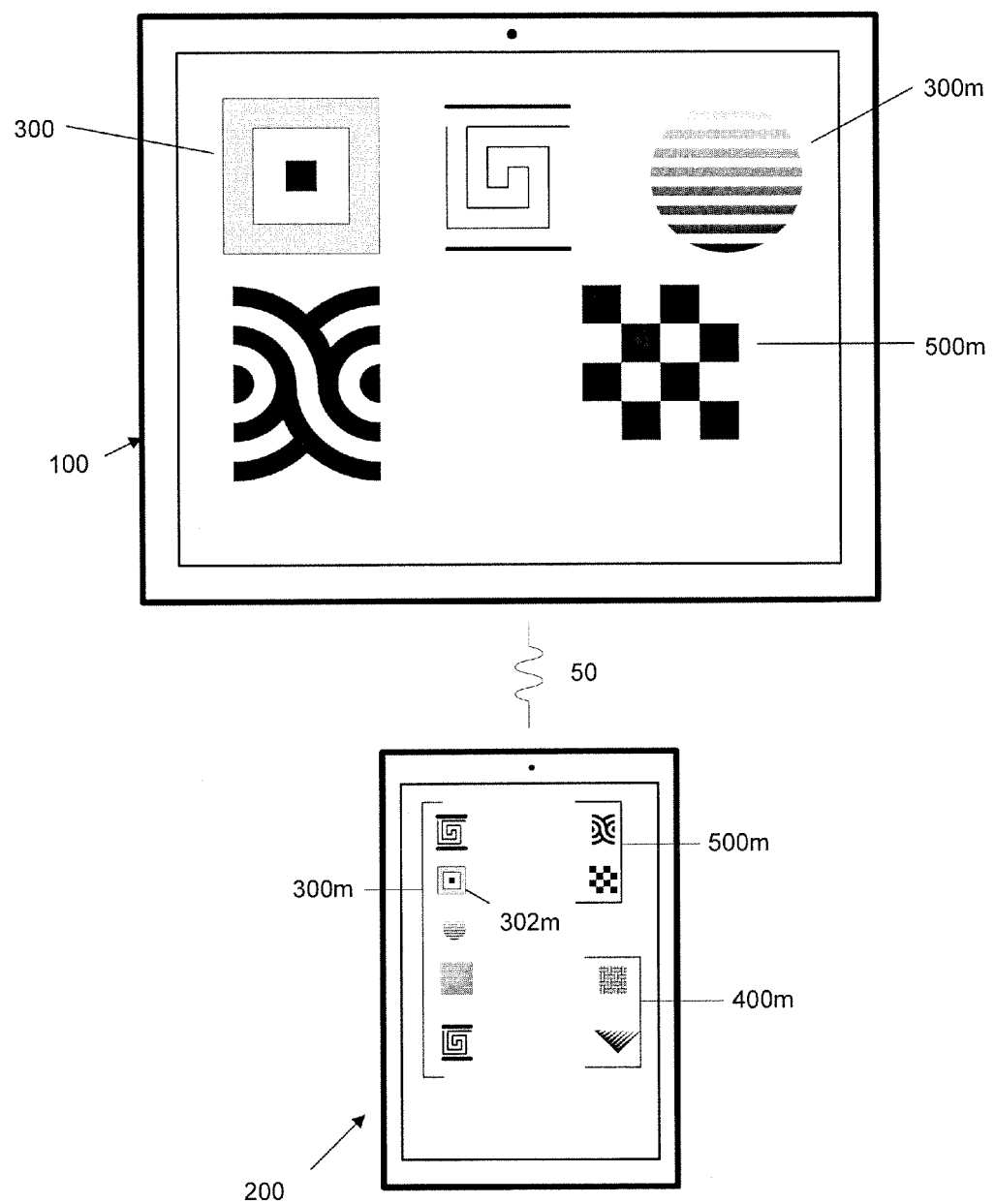

IN-VEHICLE TABLET

BACKGROUND INFORMATION

In recent years, vehicle manufactures have begun providing telematics systems in some of their vehicles. Telematics refers to the integration of computing, wireless communications, and GPS for sending, receiving and storing information over vast networks. More specifically, the term can refer to automobile systems that provide a variety of emergency and navigational services to motorists. Telematics systems allow drivers to browse the Internet, send and receive e-mails, receive live traffic updates, listen to satellite radio, and perform various other activities. Most of these tasks can be done hands-free through voice recognition.

Current telematics systems include the Ford Sync®, GM/Chevrolet's new infotainment system and On Star®, the Toyoda Entune™, Renault R-Link™, and other systems in luxury vehicles offered by BMW and Audi. These in-vehicle telematics systems are not offered in every vehicle, the hardware cannot be updated as the systems age without removing and replacing the entertainment system, and may not support the particular mobile stations owned by the user. Further, they are typically an added expense to the vehicle and may be cost prohibitive for some drivers. Older, or more inexpensive vehicles, cannot typically be retrofit to include a telematics system.

Hence a need exists for a system that can to act as a telematics system in any vehicle and can easily be removed, upgraded and transferred from vehicle to vehicle.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 1 illustrates an example of a tablet and a mobile station.

FIG. 5 illustrates an example of the icon displays of both the tablet and mobile station in telematics mode.

DETAILED DESCRIPTION

Figure 2:
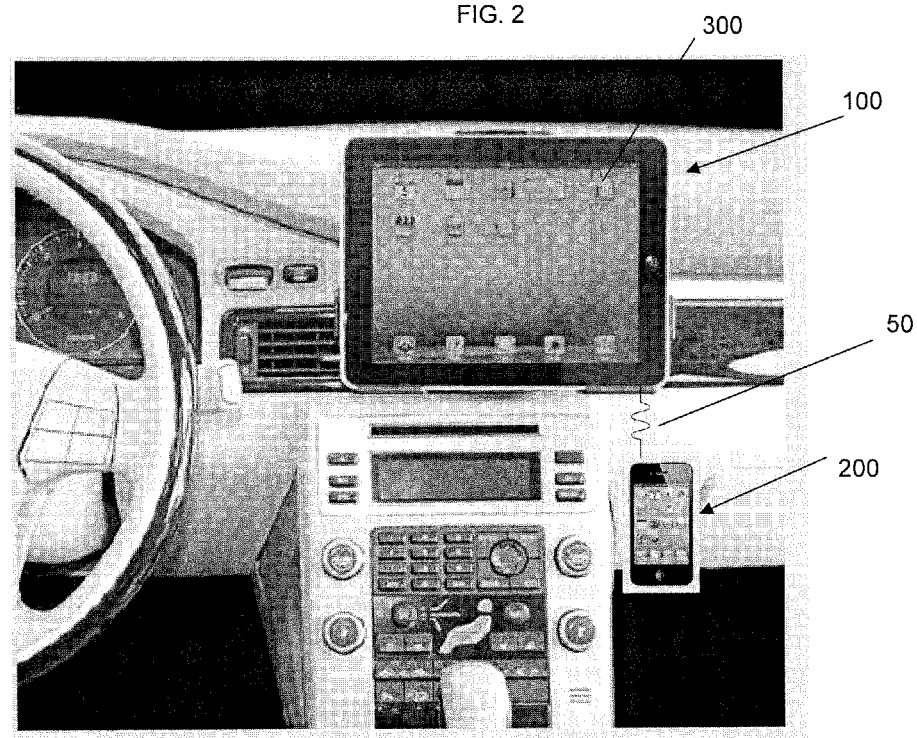
FIG. 2 illustrates a tablet and mobile station mounted in a vehicle as an example of a telematics device.
Figure 3:
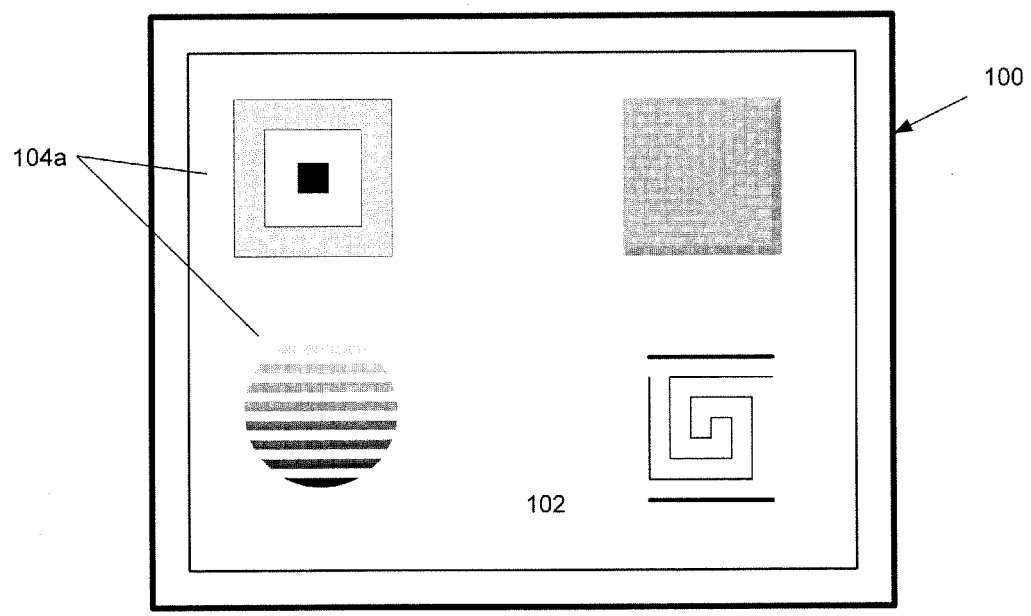
FIG. 3 illustrates a tablet in telematics mode.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to interfacing one or more mobile stations to act as a telematics system.

Reference now is made in detail to the examples illustrated in the accompanying drawings and discussed below. FIG. 1 illustrates a basic tablet device 100 and mobile cellular device, i.e. a mobile station 200. The tablet device 100 is typically defined as a general-purpose computer contained in a single panel. Its distinguishing characteristic can be the use of a touch screen 102 as the main input device. These devices are typically owned by a user along with the mobile station 200. Tablets 100 can typically access one or both of the Wi-Fi and cellular networks for data transfer. The mobile station 200 is a device that can access at least the cellular network and be used for voice communications (i.e. telephone calls, push-to-talk, etc.). Mobile stations 200 can also access the cellular or WiFi networks for data transfer.

Both the tablet device 100 and the mobile station 200 can be used as a GPS device, a camera, an audio and video playback device, utilize the Internet, and send and receive e-mail and text messages. Both typically include a touch screen 102, 202. The tablet's 100 touch screen 102 is typically 7 inches diagonal or greater, and usually 10.1 inches or less, and the mobile station's 200 screen 102 is usually much smaller. Both are used to display icons 104, 204 representing the applications present on the tablet 100 and mobile station 200, respectively.

One or both devices can also include a global positioning system ("GPS") chip 106, 206. The GPS enabled tablet 100 or mobile station 200 can be used for location and directions, access a database of attractions and businesses to search, and others can receive real-time traffic information. The GPS application also typically has a voice component to speak the turn-by-turn directions to the driver.

Users can typically use one or both devices 100, 200 while traveling in a vehicle. A dedicated GPS device (not illustrated) can also be used for directions, the mobile cellular device for telephone calls and the tablet for entertainment. Further, one or both of the mobile station and the tablet can substitute for the GPS device, as discussed above. However, the use of these devices while operating a vehicle (e.g. driving a car) can be redundant or dangerous. Having both a GPS device and a separate GPS-enabled mobile station 200 is redundant. However, the mobile cellular device typically has a smaller screen and typically does not have a car mount conducive to allowing the user to use it easily while driving. The tablet 100 has a larger screen 102, but may not be fully equipped with elements such as a cellular connection for information or a GPS chip for determining location, typically does not have a car mount for driving, and can increase the driver's distraction since it can be used as an entertainment device while the user is driving.

The combined use of the two, or three, devices can act as a makeshift telematics system. However, each of the three devices requires independent operation, resulting in an increased potential for distraction to the driver while operating the vehicle.

FIG. 2 illustrates that the tablet 100 can be provided with a tablet telematics application to unify most or all of the devices in a vehicle to act in concert as a telematics device. A mobile station telematics application can also be installed on the mobile station 200. The telematics applications can link the in-vehicle tablet 100 and the mobile station 200 and the link 50 can be formed wirelessly, or over an interconnected wire e.g., external to the vehicle. The application, described in detail below, can be activated manually by a user or automatically when the tablet 100 is set into a vehicle mount 75 (see FIG. 9A).

The tablet telematics application can convert the tablet 100 to "telematics" mode. In telematics mode, the tablet screen 102 can change screen resolution to increase the size of the icons 104, or just increase the size of the icons 104 (without changing the screen resolution). For example, icons 104, 204 for both a tablet and mobile station can range from 15×15 pixels to 62×62 pixels (approximately 0.1 inch×0.1 inch and 0.4×0.4 inch, respectively, depending on the dots-per-inch ("DPI") of the screen, 102, 202). The icons 104, 204 can be increased to anywhere between 99 and 200 pixels square, and more. The large format icons 104a, are designed to increase user visibility while the user is operating the vehicle.

Figure 4A:
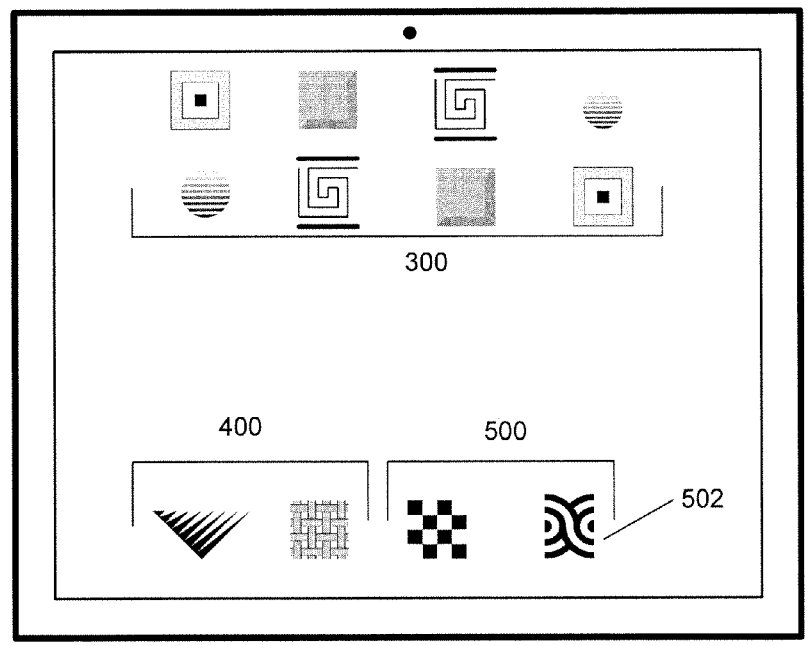
FIG. 4A illustrates an example of icon displays while out of telematics mode.
Figure 4B:
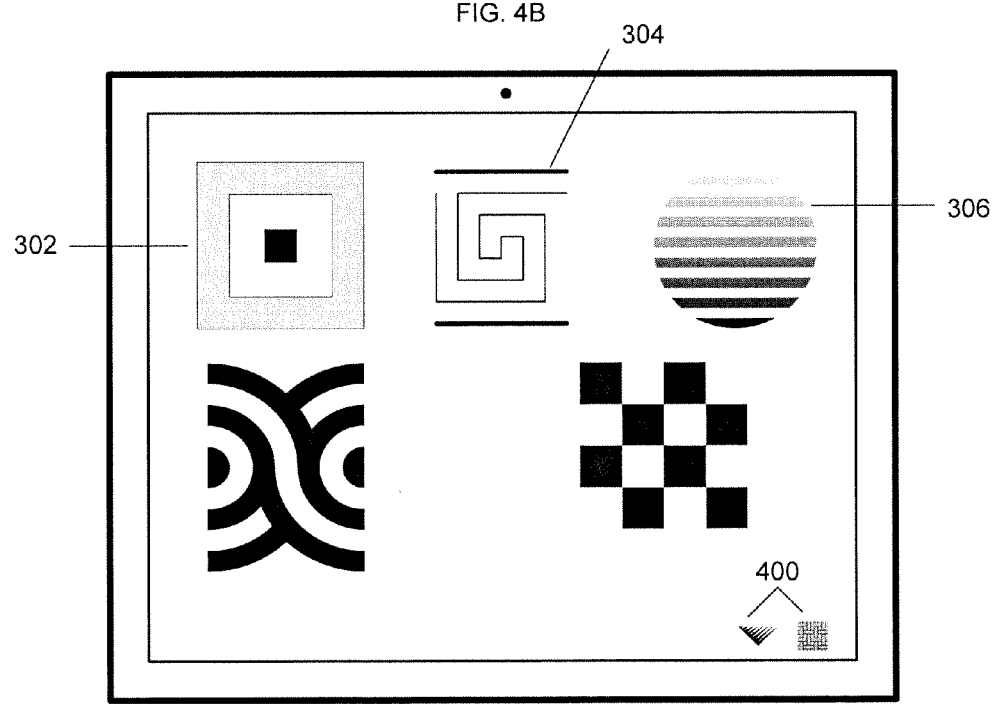
FIG. 4B illustrates an example of icon displays while in telematics mode.

Another example, illustrated in FIGS. 4A and 4B, of the in-vehicle tablet 100 in telematics mode provides for the selection and restriction of certain applications. The tablet 100 of a typical user can have applications 300 useful for operating a vehicle. The vehicle applications 300 can include, for example, a GPS application 302 for allowing the tablet 100 to act as a GPS device and provide turn-by-turn directions (e.g., VZ Navigator), traffic information, and location searching. Other vehicle applications 300 can include, at least, Internet radio 304, and an audio file player 306. In a further example, the vehicle icons 300 can be preset by the driver and/or preset by the driver in a particular display pattern before entering telematics mode.

Other non-vehicle applications 400 can include games, video players, word processors, spreadsheets, and accounting programs, to name a few. Once in telematics mode, in one example only the icons for vehicle applications 300 are increased in size, while the non-vehicle applications 400 remain the same size or are reduced even smaller in size than they are normally displayed when not in telematics mode. In a further example, in telematics mode, the non-vehicle applications 400 can also not be displayed at all on the display 102 or disabled so they cannot be operated while the tablet 100 is in telematics mode.

Further, partial applications 500 can be used for both driving and non-driving purposes. For example, most media players can play both audio and video files. Audio file playback while operating a vehicle may be acceptable, but video playback may be an unacceptable distraction. The application can selectively disable portions of the partial application's 500 functionality. Thus, in the example, only audio only file formats can be played while in telematics mode. Alternately, all file types can be played, but the video portion of a playback may be disabled, so only the audio can be heard (e.g., the visual portion of a video playback is blacked out).

Other applications 500 that fall into this category may include web browsers 502. Certain features and websites can be locked out or limited once in telematics mode. For example, selective searches can be performed to determine nearby landmarks and features but a driver may not be able to access Facebook, LinkedIn, MySpace, Twitter, etc.

The determination of a vehicle application 300, a non-vehicle application 400, or a partial application 500, can be set by the author of the application 300, 400, 500 or the telematics application can contain lists for the types of applications. Author-generated determinations for application type can be monitored by the retailer (typically on-line) that provides or sells the applications so that an inappropriate application cannot be designated as a vehicle application 300. Further, the telematics application can default any application as a non-vehicle application 400 if it is not properly designated as a vehicle 300 or partial 500 application.

Another example that can be a feature of the telematics application is the ability of the user to determine which applications are vehicle applications 300, which are non-vehicle applications 400, and which are partial applications 500. The user can be warned if she selects a designation for an application that is contrary to a designation previously set by the author, user, or third-party (such as the vendor selling the application, or manufacturer of the tablet or vehicle or the network provider (e.g. Verizon Wireless)) or as noted in a pre-set list. The pre-set list can be set by vendor selling the application, the tablet manufacture and/or the vehicle manufacturer. At one point, there can be laws or regulations passed that provide guidelines for use, similar to the "hands-free" laws for cell phone use while driving. For example, if the user designates a non-vehicle application 400 as a vehicle application 300. Further, the user can be warned if a user-designated partial application 500 cannot be partially disabled. Also, the user may be able to designate which features of the partial application 500 are disabled while the tablet 100 is in telematics mode.

Additionally, the user can be able to designate at least one of the location, size, and labeling of the icons for the vehicle applications 300, non-vehicle applications 400, and/or partial applications 500. The designation can be performed while the tablet 100 is not in telematics mode. Alternately, the location, size, and labeling of the icons can be standard and not a configurable option for the user.

Either the telematics application or a vehicle application 300 may have voice recognition. Using voice recognition, many or all of the vehicle applications 300 and their related functions can be operated by voice commands. The voice recognition can use a standard menu of commands, and can be customized so specific voice commands can perform certain tasks. In one example, a voice command can be linked to a macro to execute a series of applications or features with one command. This functionality can be similar to key mapping on a keyboard. For example, the voice command "work" can activate both the GPS application 302 to display vehicle location, roads, and traffic and tune the internet radio 304 to local news and weather reports. This feature can be set by the user individually selecting each of the applications and the features therein (e.g. the station on the internet radio 304), or the voice command application can access the information stored on the tablet 100 and mobile device 200 and use them for preset commands. For example, the application can look to the user's contacts to determine key addresses like work and home, and can access the radio presets to determine which station to tune into. It can assemble the information for a preset command like "home" or it can narrow the selection of choices for the user when the user begins to set up the commands.

Another feature of the telematics application or a vehicle application 300 may be text-to-speech. The GPS application 302 can provide spoken turn-by-turn directions and search results to queries can be read back. Further, e-mails, SMS, EMS, and MMS messages, calendar events, and any other text file can be read back to the driver. In one example, the use of text-to-speech can temporally obscure or not display the original text to prevent the driver from reading the text as well. This feature can be set by the user individually selecting each of the applications to utilize the text-to-speech and the obscure feature. Alternately, the application can have a list of programs that are primarily text based and either query the user as to which programs should utilize text-to-speech or default the programs to utilize text-to-speech and/or the obscure feature. For example, any e-mail program, Twitter, and any word processor can be automatically designated to use text-to-speech.

For the voice recognition, the microphone 108 on the tablet 100 can be used, as well as any other microphone linked to the tablet (e.g. a Bluetooth enabled headset). For audio playback, text-to-speech or any other sounds or alerts generated, the speaker 110 on the tablet can be used. Further, any other speaker linked to the tablet (e.g. a Bluetooth enabled headset) can also be used. The voice recognition can also allow the driver to dictate search terms, e-mails, tweets, etc.

Another example of a telematics system includes the mobile station 200 along with the tablet 100. As noted above, and illustrated in FIG. 2, the mobile station 200 and the tablet 100 can be linked 50. Once the telematics application on the tablet 100 is activated, the telematics application on the mobile station can also be activated, placing the mobile station 200 into telematics mode. The interface 202 for the mobile station 200 can generally be disabled, so as not to distract the driver. Control over the mobile station 200 can be fully or partially handed over to the tablet 100. Disabling the interface 202 for the mobile station 200 can include keeping the display darkened, displaying a message noting that the mobile station 200 is disabled, and/or ignoring any inputs through either a touch screen or hardware keyboard. One exception to disabling the interface 202 can be to allow for an emergency call to be placed, even when linked.

In this example, illustrated in FIG. 5, there can be functions and applications on the mobile station 200 that are exclusive to the mobile station 200 or are shared by it and the tablet 100. Notably, it is typically only the mobile station 200 that can make and receive voice calls over a cellular network. When in telematics mode, any vehicle applications 300m on the mobile station 200 can be displayed on the tablet display 102. The display and use of the applications 300m, 500m on the tablet 100 is a function of the mobile station 200 and the tablet 100 being linked 50. Further, the tablet 100 and mobile station 200 can determine which applications to display and use while in telematics mode. Alternately, the user can select which applications, residing on which device, to user. Thus, if only the mobile station 200 is GPS enabled 206, then the GPS icon 302m displayed on the tablet 100 can activate the functions on the mobile station 200. If the tablet 100 and mobile station 200 are not linked, the applications on the mobile station 200 are not shared or placed under the control of the tablet 100.

When linked, some or all of the related data generated by a mobile vehicle application 300m can be passed to the tablet 100 to be presented to the driver, including visual and audio data presented by their respective outputs 102, 110. Information can then be taken in by the tablet 100 at the touch screen 102 or microphone 108 and passed back to the mobile station 200.

If a vehicle application 300, 300m is present on both devices, the driver can preset which application takes precedence. That is to say, which of two identical or similar applications are displayed and used when the tablet 100 is in telematics mode. Alternately, the telematics application can determine which application to use based on physical parameters of each device. For example, which device has more available memory, faster processor speed, or better reception to the available information (e.g. cellular, Wi-Fi, or GPS satellites). This also holds true for the partial applications 500m on the mobile station 200. In another example, the non-vehicle application 400m on the mobile device is not displayed on the tablet 100. This prevention of displaying the non-vehicle applications 400m from the mobile device 200 on the tablet 100 can be independent of, or linked to, whether or not the tablet's non-vehicle applications 400 are displayed or displayed in a reduced size.

As noted above, the tablet 100 can control features of the mobile station 200 and exchange information with it as well. Thus, hands-free calling through the mobile station 200 can be projected through the microphone 108 and the speakers 110 of the tablet 100. Similarly, a driver can have full access to her contacts and calendar functions. In one example the application can restrict access to them to voice activation only. Thus, neither function can be operated using manual commands on either device. In addition, the responses of the particular function to the voice activation can be provided only in speech format, with minimal to no display of information. The restriction of access to certain features of applications can be set in advance by the user, or be default set by the application. For example, both the contacts and calendar, when the tablet 100 is in telematics mode, can only be accessed by voice commands. Manual input for these features can be prevented. Features such as this can be initiated as soon as the tablet 100 or tablet 100 and mobile device 200 are placed in telematics mode.

Figure 6:
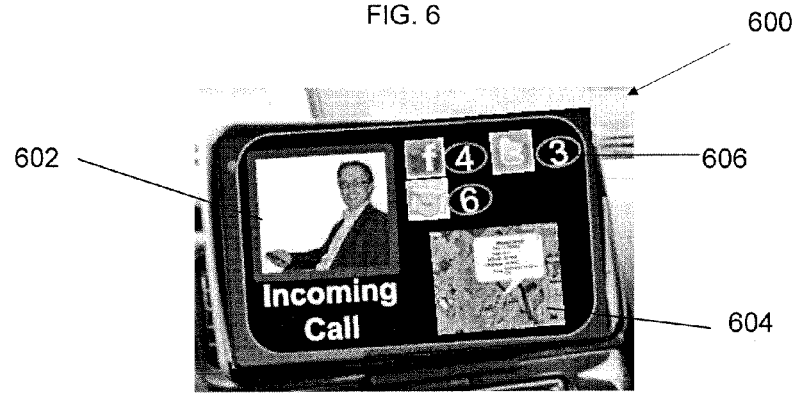
FIG. 6 illustrates an example of an in-vehicle caller-ID.

Other features of the applications can be an in-vehicle caller-ID 600, see FIG. 6. This can display a photo 602 of the caller and the caller's location 604 on the driver's existing map, or it can be switched to a map specific for the caller. Other information can include updates 606 from other communication formats. For example, the in-vehicle caller-ID 600 can display the number of unread Facebook posts, tweets, and e-mails received by the driver by the caller.

In addition, the driver, after reviewing any document or communication can identify the document or communication for automatic display when a caller or the driver places a call and is identified by the in-vehicle caller-ID 600. For example, the driver, either previous to or while in telematics mode, receives an email from a third party. The driver can then tag the e-mail to be identified or opened when the driver calls the third-party using the mobile device 200 or the third-party calls the mobile device 200 of the driver. Alternately, the driver can link a document to one or more contacts, and when the contact calls in, the document is opened.

In this way, the driver can have ready the document or communication relevant to the caller and does not need to search for it either during or after the call. Additionally, the document or communication can be read, using the text-to-speech function, either during or after the call, upon command of the driver. In this way, the driver can have the document or communication read to the caller while on the call without the driver having to read the text. Further, the in-vehicle caller-ID 600 can be preset to identify the last communication or document authored by the caller as identified by the caller-ID and automatically open it without any driver pre-selection.

Figure 7A:
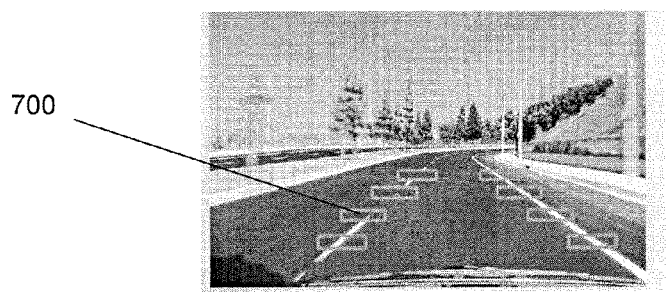
FIG. 7A illustrates an example of an Advanced Driver Assistance System for lane identification.
Figure 7B:
FIG. 7B illustrates an example of an Advanced Driver Assistance System for low light or infrared cameras.
Figure 7C:
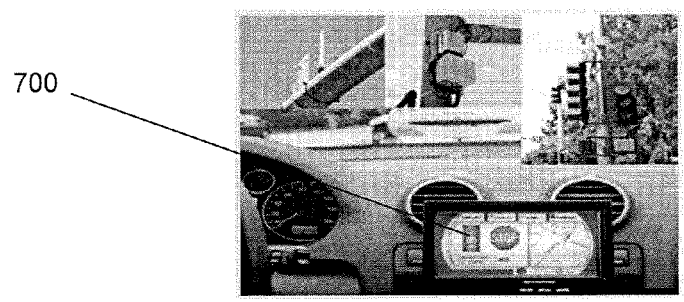
FIG. 7C illustrates an example of an Advanced Driver Assistance System for traffic control device detection.

Other vehicle applications 300 can include Advanced Driver Assistance Systems (ADAS) 700. These systems can include features such as lane departure warning system, lane change assistance, collision avoidance system (precrash system), intelligent speed adaptation or intelligent speed advice (ISA), night vision, adaptive light control, pedestrian protection system, traffic sign recognition, blind spot detection, and driver drowsiness detection, to name a few. The ADAS applications 700 can be implemented using the one or more cameras 112a, 112b already present on the tablet 100 and mobile station 212a, 212b (see, FIG. 1). As an example, the outward facing camera 112a can detect objects, lane markers, and traffic control devices (e.g. stop signs and red lights). FIGS. 7A-7C illustrate examples of displays of this type. The tablet 100 can also access the Internet for information regarding these ADAS applications 700. For example, the tablet 100 can access a database that tracks all red light cameras in the United States.

FIG. 7A illustrates an example of a lane identification application. The camera 112a, 212a or vehicle mounted sensors (see below) can identify lane markings to determine if a vehicle is departing its existing lane. If the vehicle is departing its lane, and a turn signal has not been activated, the tablet 100 can generate a warning using at least an audible tone. FIG. 7B illustrates an example of a low light/infrared display. At times of low light or visibility (e.g. night time or fog), the camera 112a, 212a can alter its resolution to be more sensitive to low light and project that image on the display, improving the driver's night vision. Also, as above, and discussed below, the tablet 100 can interface with sensors mounted on the vehicle to provide or enhance the low light/infrared capabilities. FIG. 7C is an example of a traffic signal identification and warning system. The tablet 100 can receive data providing the location of traffic control devices and/or traffic cameras. The tablet 100 can warn the driver audibly or visibly to slow down as she approaches the device, or notify her that there is a traffic camera present.

The driver facing camera 112b can detect the driver's condition, and can be used to identify objects either in the vehicle or out the side or rear windows. For example, the driver facing camera 112b can be used as a rear-view "mirror" or can be used to project an image of a back seat passenger, e.g., an infant. Further, the cameras 212a, 212b on the mobile station 200 can also be utilized, in both the forward and rearward facing capacities. Depending on the tablet 100 and mobile station 200, four or more cameras can be present in the vehicle and utilized while in telematics mode for different applications 300, 300m, 500, 500m.

Once such application using the driver facing camera 112b is face recognition. Each driver of a vehicle can preset all aspects of the telematics mode and once the application 300 enters the mode, it can begin by identifying the driver and configuring at least the display 102. Further, once in communication with the vehicle, the tablet 100 can configure settings on the vehicle.

Figure 8A:
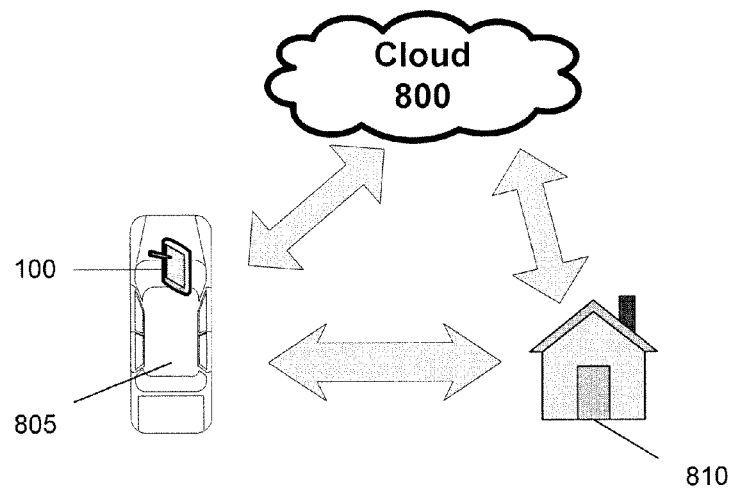
FIG. 8A illustrates an example of the telematics tablet accessing a cloud network and a home network.

In a yet further example, illustrated in FIG. 8A, the tablet 100, in telematics mode in vehicle 805, can also receive applications and data from a network "cloud" 800. The cloud 800 can be a repository for data and applications and provide additional computer processing. The tablet 100 can access the cloud 800 over a wireless network, at least Wi-Fi or cellular. Any or all of the vehicle applications 300 or partial applications 500 can reside and be accessed through the cloud 800 and displayed on the tablet 100.

Access to the driver's home 810 can also be directly available or through the cloud 800. This can allow the driver to send and receive data and operate devices networked at the home 810. This includes alarm settings, opening or locking entry points, lights, television receivers, digital video recorders, etc. The system can be compatible with any home network device or communication protocol, including X10.

Further, multiple telematic tablets 100 can assess and exchange data with a common cloud 800. This can allow each individual tablet 100 to report their GPS determined position, direction, speed, etc. Applications can access that data and provide real-time accident and traffic flow reports. This can also be beneficial for collision avoidance, and weather related incidents. In a commercial example, a dispatcher can use this feature to select not only the closest vehicle, but the one headed in the same direction. Traffic information can not only warn of an impending traffic jam, and suggest an alternate path, but can select the fastest of all possible detours based in real-time.

Figure 8B:
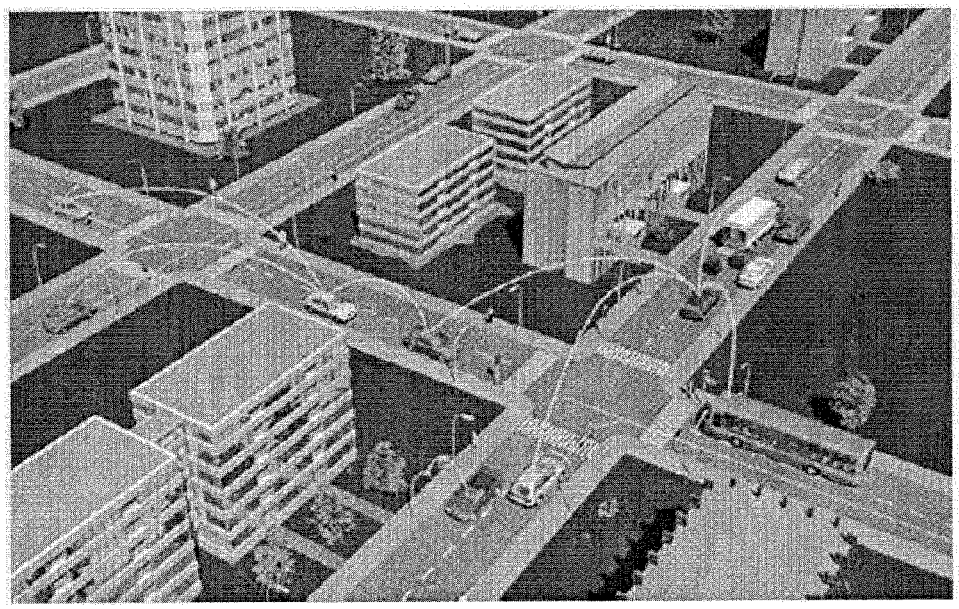
FIG. 8B illustrates an example of multiple vehicles with telematics tablets communicating peer-to-peer.

FIG. 8B illustrates a similar concept, but the tablets 100 in the individual vehicles 805 are networked directly with those in proximity and are not hubed through the cloud 800. The tablets 100 can also be linked with the municipal infrastructure which can use the location information, for example, to change the red-green cycle of traffic lights in a particular area. The link can also extend to toll collection. The tablet 100 can act as a toll collection transponder (e.g. EZ-Pass), using the tablet's location to trigger the debit to the driver's account. This can save the municipalities the cost of stocking and maintaining transponders for this specific purpose. This can also allow a driver to access non-interchangeable toll systems without having multiple transponders.

To act as a toll collection transponder, an additional antenna or microprocessor may be installed in the tablet 100 or mobile device 200 to operate on the transponder frequency. Alternately, another toll collection scheme can be implemented that can utilize the standard features of the tablet 100, including the GPS chip 106, 206.

Figure 9A:
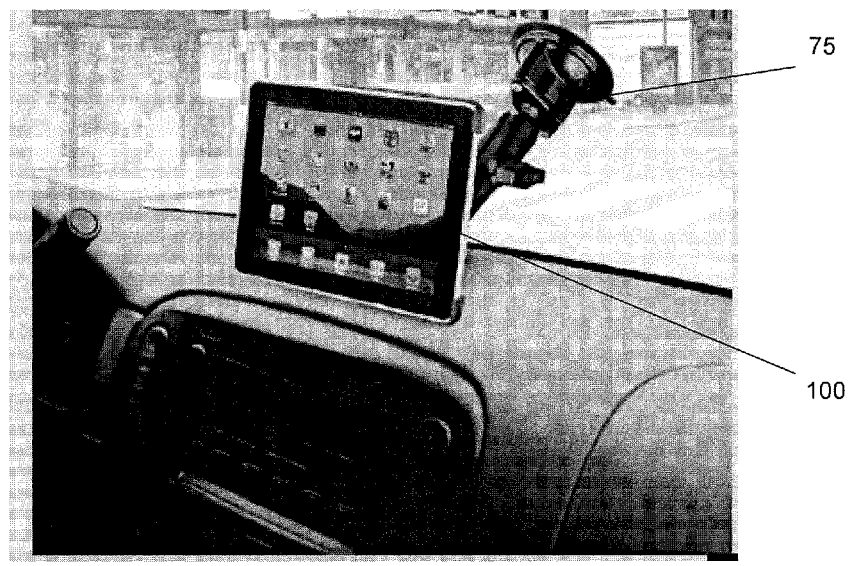
FIG. 9A illustrates an example of a vehicle mount for a telematics tablet.
Figure 9B:
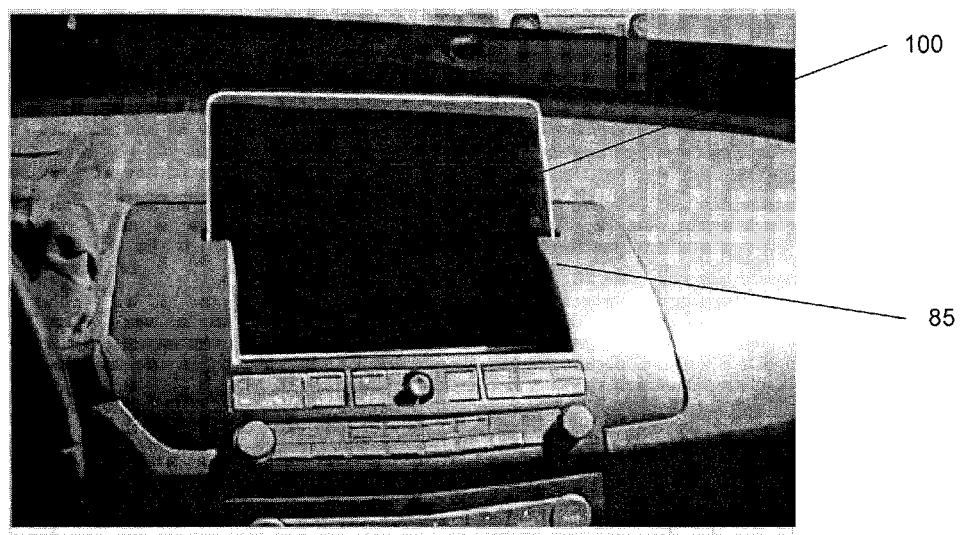
FIG. 9B illustrates an example of an in-dash mount for a telematics tablet.

In further examples, a number of vehicles have interfaces, either wired or wireless, that allow the tablet 100 and/or mobile station 200 to interface with the vehicle. The interfaces can be part of the mount 75 or an in-dash interface 85. FIGS. 9A and 9B illustrate examples of both types of mounts/interfaces.

The interface can include linking the tablet 100 to microphones and speakers mounted in the vehicle, a dedicated display device, specialized keys that are part of the entertainment system or mounted on the steering wheel, and utilizing the vehicle's antenna. Once linked to the vehicle, the tablet 100, in telematics mode, can perform a number of other applications. The tablet 100 can now utilize sensors and features built into the vehicle. For example, the tablet 100 can have access to the crash/airbag sensors so it can be used to call for assistance in the event of a crash (e.g. similar to On Star®). Access to the vehicle sensors can be granted through the tablet/vehicle interface discussed above. Applications 300, 500 can be provided that can read and interpret sensor data and access other applications 300, 400, 500 for additional tasks.

The tablet 100 can also receive data from the vehicle regarding vehicle conditions and can automatically schedule maintenance visits. For example, the tablet 100 can realize that the vehicle has driven more than 3,000 miles since the last oil change, can review the driver's calendar, and suggest or schedule a tentative appointment for an oil change. The reminders can be triggered at automatic or preset milestones. An example is that the oil change can be preset to be scheduled once the vehicle reaches 3,000 miles, or 100 miles before the 3,000 mile limit. Again for the selection of the time slot, the system can pick any available time slot within the business hours of the repair shop. Information regarding the repair shop can be entered by the user or the telematics system can access the Internet and find the information from the provider's web site or other Internet based sources (e.g. Google, Yelp, etc.). Alternately, the user can provide suggested periods for each type of reminder. For example, only weekends, only after 5:00 pm on weekdays, etc. Further, performance information can be transmitted to a dealer/mechanic and certain maintenance problems can be diagnosed before the vehicle is brought to the repair shop. In addition, once the appointment is set, the telematics system can also set reminders to make sure the user does not miss the appointment.

The tablet 100 can also be used to control features such as seat position, temperature, and entertainment station presets. Typically both the tablet 100 and mobile station 200 are primarily or exclusively used by one user. Once the tablet 100 is linked to the vehicle, the vehicle can receive or retrieve the user's profile for the vehicle. These presets can be linked to a specific driver, which, as noted above, can be identified by accessing the tablet, face recognition, voice recognition, or any other biometric identifier.

Further, since the tablet 100 typically has the user's information, including a calendar, once the tablet 100 is connected to the vehicle using a mount 75 or interface 85, the tablet 100 can query the user to take them to the location of the next appointment on the calendar. This is presuming that the GPS location of the vehicle is outside a particular radius, say 25 feet, from the destination.

Additional information can be collected by the tablet 100 either alone or from the vehicle's sensors. Vehicle telemetry can be exchanged with the vehicle owner or insurance providers to allow for the provider to monitor driving behavior and extend discounts for safe driving. Options can allow this feature to be selected on or off The ability to activate or deactivate this feature can be protected by password. This monitoring can extend to a parent monitoring a novice driver or a dispatcher monitoring a fleet of vehicles. From the above, the parent or dispatcher can enable the monitoring, and the child or driver may not be able to disable it. The speed, distance, and locations of prolonged stops can be recorded, or transmitted to another device in real-time. The length of time for a stop can be preset by either the driver or the person monitoring the vehicle. For example, there may be an average stop time for a delivery vehicle and anything 10 minutes longer can be defined as a prolonged stop. The time scale can be flexible, from any halt in motion, to time ranging from minutes, hours or days.

Access to the vehicle's sensors, diagnostics, and/or telemetry can be through On-Board Diagnostics ports (OBD/OBDII). The tablet 100 can be connect to the vehicle's native system through the OBD port and cable or wirelessly (e.g. as a Bluetooth® pairing). The vehicle's system can provide operational health/status information for specific components or systems in the vehicle, as well as mileage. As an example, mileage information can be used for mileage-based insurance purposes, mileage-based leases or rentals, and service life.

Further, with the cameras 112*b*, 212*b* any passengers can also be identified. This feature can also act to trace the vehicle location if there is an unauthorized user. The use of the trace features can be triggered numerous ways. Real time video or still pictures can be transmitted automatically when a certain driver is identified as controlling the vehicle. A signal from a device that can communicate with the tablet 100 but is not linked or in the vehicle can request the start of the video stream or the pictures to be taken. The pictures requested can be from all or any of the cameras 112*a*, 112*b*, 212*a*, 212*b* linked to the telematics system.

Other features that can be built into a vehicle and accessed by the tablet 100 are, as an example, collision radar, laser road sensors, low light/infrared cameras, standard cameras in the rear and blind spots of the vehicle, satellite radio, and tire pressure sensors. The sensors can be made add on packages by the dealer. Only the wiring need be run on assembly between the locations of the additional accessories and their position on body/frame of the vehicle. This may avoid complex or expensive computing being added in the vehicle as the tablet 100 can control the accessories. This can also allows any model vehicle to be upgraded with the additional accessories, not just the "luxury" models.

In another example, all of the in-vehicle sensors can be linked to an on-board computing device in the vehicle. The tablet 100 can then connect (wired or wireless) to the on-board computer to access the sensor data.

Figure 10:
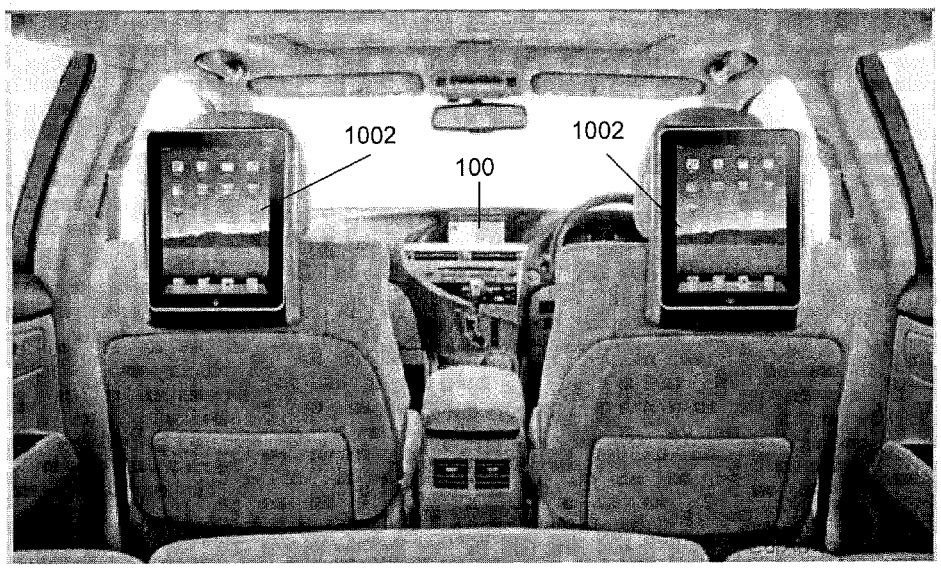
FIG. 10 illustrates an example of passenger devices in the back seats of a vehicle.

Vehicles passengers can also have passenger mobile stations (not illustrated) or passenger tablets 1002 (collectively "passenger devices"). FIG. 10 illustrates the back seats of a vehicle with two tablets 1002 mounted to the seats. Additional telematics applications can be loaded on the passenger devices. The passenger application allows the main tablet 100 to control the passenger devices that are in the same vehicle when the tablet 100 is in telematics mode. The control of the passenger devices can be extensive. The tablet 100 can disable certain features, like voice calling, messaging, e-mails, games, and audio and/or video playback. Alternately, the tablet 100 can act as a hub for data, providing a stream of data to one or more of the passenger devices for a coordinated playback. Further, the tablet 100 can divide control over certain telematics mode functions between the tablet 100 and one or more of the passenger devices 1102. For example, the tablet 100 can be the master controller, however, the front passenger's passenger device 1002 can control the permissions and data streaming to the remaining passenger devices.

Control over the passenger devices can be utilized as a form of "parental control" either to display a common audio or video file, or to restrict the passenger's uses of the devices. This control can be extended to passengers on public transportation. If a passenger is utilizing a network provided by a transportation provider, the device can be disabled. For example, if the devices are utilized on an airplane, the airline can provide the "in-flight" movie streamed to the devices in lieu of providing seat back monitors. In addition, certain features can be disabled by the airline during certain periods of the flight, e.g. takeoff, landing, and announcements.

An additional example can include a "stopped" mode. The tablet 100, while in telematics mode, can determine that the vehicle has not moved for a specified period of time. After this preset time, it can release some or all of the restriction on use. For example, the tablet 100 can allow the additional functionality of the partial applications 500, 500*m* and/or allow access to the non-vehicle applications 400, 400*m* while the vehicle is stopped. This allows a user to use the tablet 100 while parked, either in a parking lot or on the side of the road, etc. However, once the tablet 100 senses that the vehicle is in motion, it reverts back to full telematics mode. It can allow certain applications that are permissible in telematics mode to remain and other that are not, to be paused or saved.

The preset times can be standard or set by the user, and the times can include times in seconds or minutes. For example, the tablet 100 can revert to stopped mode after 15 seconds. Allowing a user at a red light to access certain features not available while the vehicle is in motion. A typical red light lasts approximately 3-4 minutes and a user can use that time to access a non-vehicle application 400, 400m. If the application is permissible during vehicle motion, e.g. hands-free calling, even if it is activated in stopped mode, it is still functional once the vehicle is back in motion. The stopped mode can be removed, so the tablet 100 must be dismounted to disengage telematics mode, or set for long periods (e.g. 5 minutes, longer than an average red light) so the vehicle must be fully stopped. Alternately, the tablet 100 can receive data from the vehicle to determine not only the speed, but the gear the vehicle is in. The telematics mode, in an example, can be set to only allow stopped mode when the transmission is in "park."

Another example is that there can be two levels, stopped and "parked" mode. Stopped mode can be set for 15 seconds of non-motion, this can allow certain functionalities, for example, typing and manual selection of options, but not all application are available. Once in parked mode, either based on a longer time (e.g. stopped for 5 or 10 minutes) or that the transmission is in "park," then the remaining applications can be made available. For example, video playback and games.

The foregoing has been disclosed as a software solution. As of 2011, there are five tablet platforms offered: iPad, Android, BlackBerry, Windows and HP WebOS. Further, there are hundreds of mobile stations using a wide variety of platforms. Applications are designed for each tablet platform, and mobile station applications are developed for mobile station 200 to interface with a specific tablet. Both applications are developed for cross-platform interfacing, so at least some of the telematics features are available regardless of the tablet/mobile station platforms.

With the above noted, some or all of the above can be implemented in one or more devices. For example, a "new" tablet can be designed with a particular vehicle interface and specialized peripherals (e.g. a low light/infrared camera), and cellular capabilities to reduce or remove other devices that may be required to utilize all of the functions described above.

Figure 11:
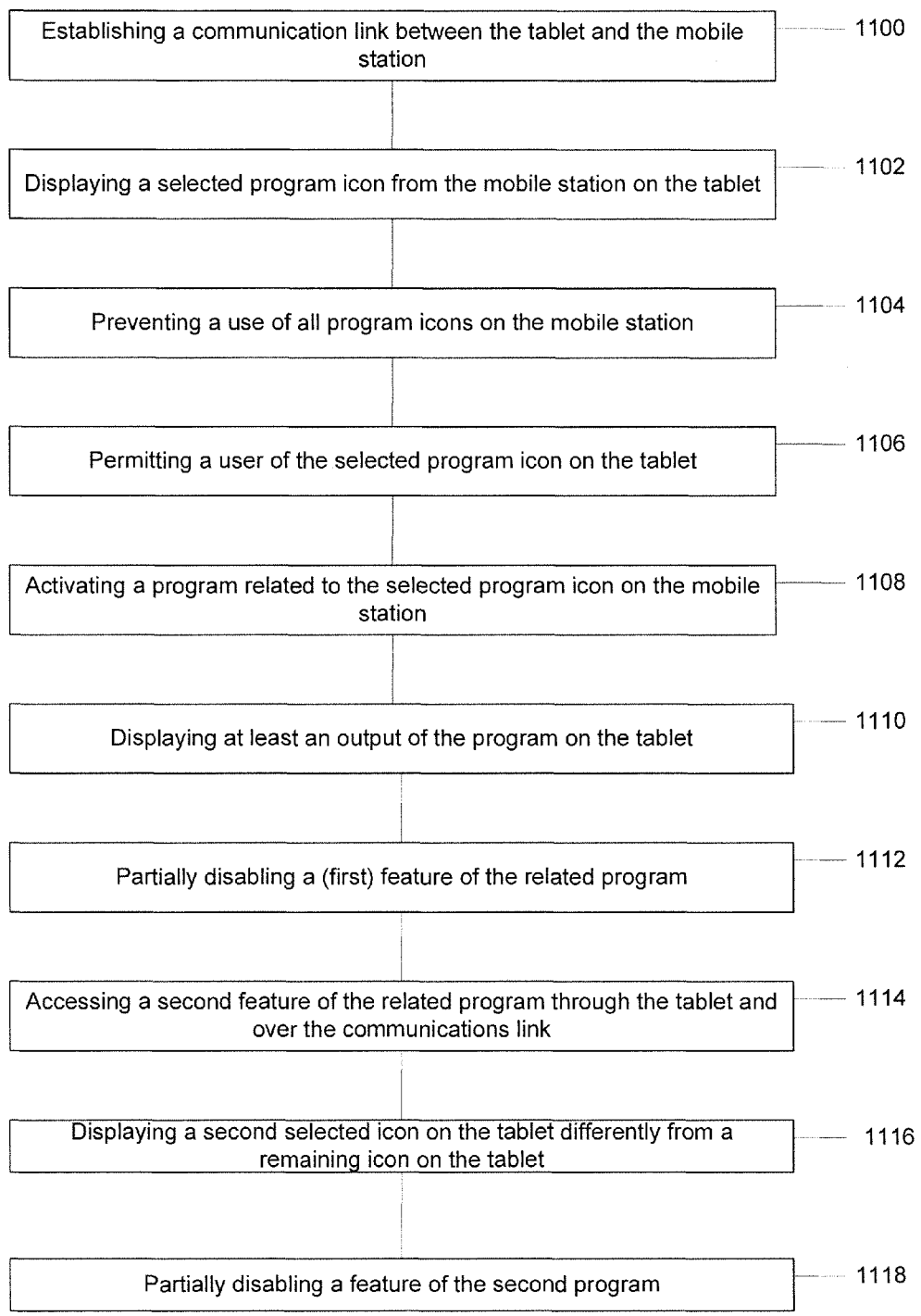
FIG. 11 is a flow chart illustrating an example of a method.

Turning now to the methods corresponding to the above, FIG. 11 illustrates an example of a method of controlling the mobile station 200 from the tablet 100. This control is typically configured to operate when the devices 100, 200 are in a vehicle. This can include the step of establishing the communication link 50 between the tablet 100 and the mobile station 200 (step 1100). The selected program icon 300m, 500m on the mobile station 200 is displayed on the tablet 100 (step 1102). The method prevents the use of all program icons 300m, 400m, 500m on the mobile station 200 (step 1104). However, the selected program icon 300m, 500m is permitted to be used on the tablet (step 1106). Once the selected program icon 300m, 500m is selected by a user, from the tablet 100, a program related to the selected program icon 300m, 500m is activated on the mobile station (step 1108). Once activated, at least an output of the program is displayed on the tablet 100 (step 1110). One or all of these steps can be enabled or disabled depending if the vehicle is in motion. For example, while the tablet 100 and mobile station 200 are in telematics mode, the tablet can "disable" the telematics mode when it determines that the vehicle has stopped. This allows the devices to be used normally while parked, and in telematics mode while in transit.

Further to the example above, the program related to the selected program icon 300m is only on the mobile station 200. In this way, the tablet 100 is controlling some of the functions of the mobile station 200. This reduces the number of displays 102, 202 the user is able to interact with and reduces distractions.

In the above, the selected program icon can relate to a vehicle application 300m or a partial application 500m. If the icon relates to the partial application, the method can include an additional step of partially disabling a feature of the related program (step 1112). With the partial application 500m, the feature can be a first feature, and the method can allow a second feature of the related program to be accessed through the tablet 100, over the communication link 50 (step 1114).

The method above can also include the steps of displaying a second selected icon 400, 500 on the tablet 100 differently from a remaining icon 300 on the tablet 100, the second selected icon is related to a second program on the tablet 100 (step 1116) and partially disabling a feature of the second program (step 1118).

Figure 12:
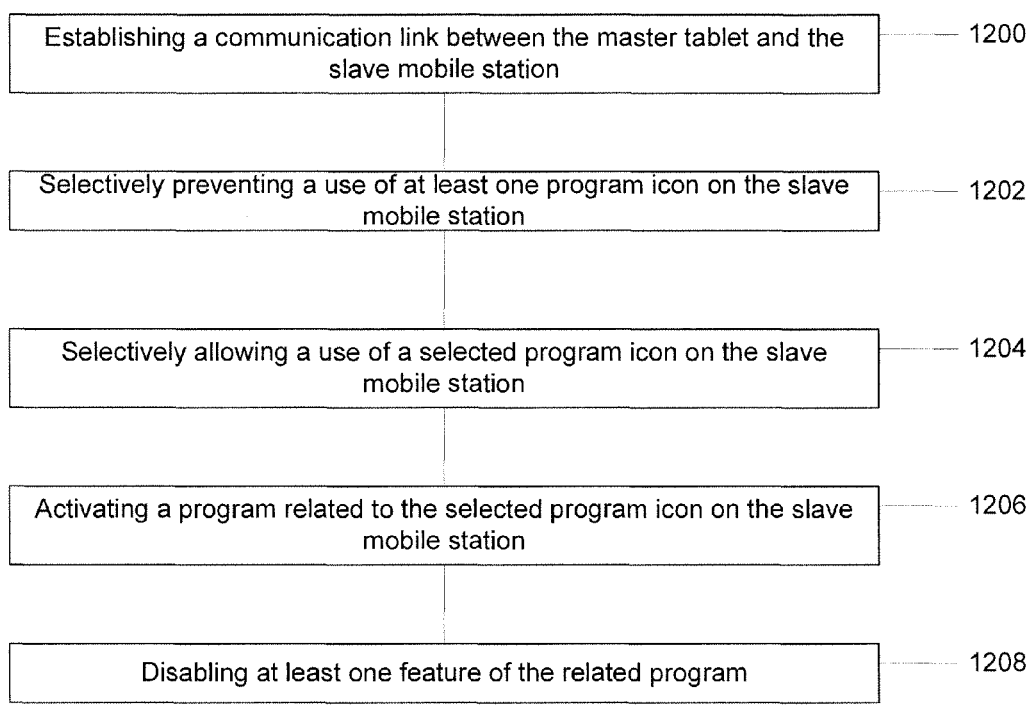
FIG. 12 is a flow chart illustrating another example of a method.

Another example is a method of controlling a slave mobile station (for example, passenger devices, i.e. the passenger tablet 1002) from a master tablet 100, as illustrated in FIG. 12. The method includes the steps of establishing a communication link between the master tablet 100 and the slave mobile station (step 1200). The master tablet 100 can selectively prevent a use of at least one program icon on the slave mobile station 200 (step 1202) and selectively allow a use of a selected program icon on the slave mobile station 200 (step 1204). As part of the selective allowance step, the master tablet can activate a program related to the selected program icon on the slave mobile station (step 1206). Further, it can disable at least one feature of the related program (step 1208). In another example, the selected program icon can only reside on the slave mobile station. As noted previously, this master/slave control scheme can be when the master tablet 100 is at least acting as a telematics device and the slave mobile station is not acting as part of the telematics device. Thus, the slave mobile station is not the "linked" mobile station 200, but a passenger device.

As known in the data processing and communications arts, a general-purpose computer, which includes a tablet 100, typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for the various country determination and technology detection lists. The programming code is executable by a microprocessor on both the tablet 100 and on the mobile station 200. For downloading and installation, however, the software can be stored within the general-purpose computer platform.

Figures 13, 14:
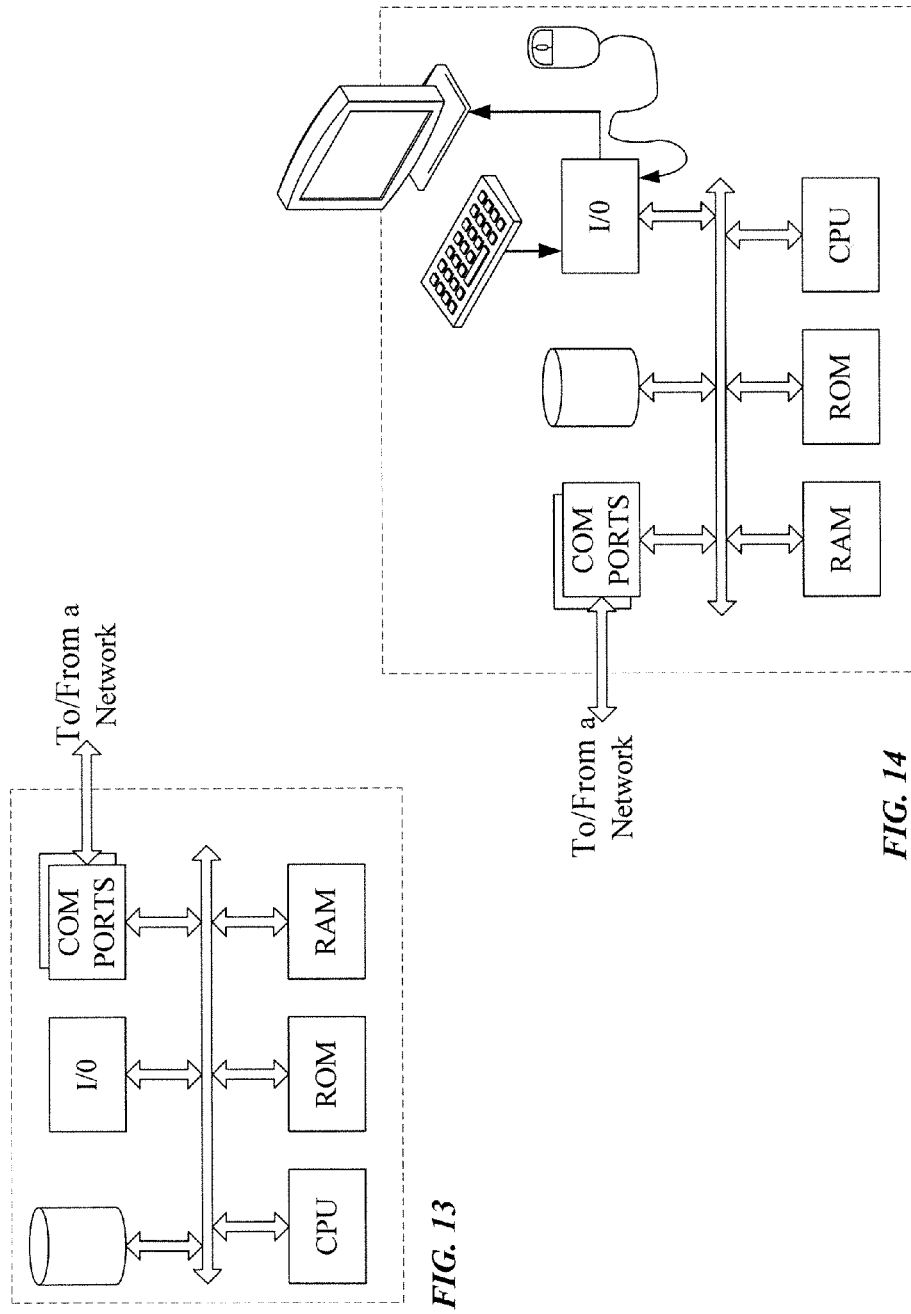
FIG. 13 is simplified functional block diagram of a computer that may be configured as a host or server.
FIG. 14 is a simplified functional block diagram of a personal computer or other work station or terminal device

FIGS. 13 and 14 provide functional block diagram illustrations of general purpose computer hardware platforms. FIG. 13 illustrates a network or host computer platform, as may typically be used to implement a server for the cloud 800. FIG. 14 depicts a computer with user interface elements, as may be used to implement a tablet 100, personal computer or other type of work station or terminal device, although the computer of FIG. 14 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of the telematics mode outlined above may be embodied in programming. Program aspects of the technology may be thought of as "products" or "articles of manufacture" typically in the form of executable code and/or associated list data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software programming from a computer or processor into the mobile station from another computer of a mobile network operator into the mobile station (s) of the operator's customer(s). Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or a physical transmission medium. Non-volatile storage media include, for example, optical or magnetic disks, such as any of the storage devices in any computer(s) or the like, such as may be used to implement the information flow control, etc. shown in the drawings. Volatile storage media include dynamic memory, such as main memory of such a computer platform. Tangible transmission media include coaxial cables, copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions and/or associated list data to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An article of manufacture, comprising:
   at least one machine readable non-transitory storage medium; and
   programming instructions embodied in said at least one medium for execution by a tablet and a mobile station, the mobile station being configured to display a plurality of program icons including a first program icon related to the operation of a vehicle and a second program icon not related to the operation of the vehicle, wherein the programming instructions configure said tablet and mobile station to perform functions for communications between the tablet and the mobile station, the configuring functions comprising:
automatically activating a telematics application of the tablet when the tablet is mounted in the vehicle and, upon activation, the telematics application configuring the tablet and the mobile station for use in the vehicle, comprising the functions of:
establishing a communication link between the tablet and the mobile station while within the vehicle;
displaying the first program icon from the mobile station, on the tablet using the communication link;
preventing, on the mobile station, use of all program icons including the first program icon and the second program, using the communication link;
permitting a use of the first program icon on the tablet using the communication link;
activating a program corresponding to the first program icon, on the mobile station using the communication link;
displaying at least an output of the corresponding program on the tablet using the communication link
receiving a voice command
translating the received voice command into a predetermined plurality of commands for a respective plurality of applications running on the mobile station and related to the operation of the vehicle;
transmitting the plurality of commands to the mobile station; and
receiving output data of the plurality of applications from the mobile station.

2. The article of claim 1, further comprising the function of disabling the configuring functions when the vehicle is stopped.

3. The article of claim 1, further comprising the function of establishing a second communication link between the tablet and the vehicle, wherein the second communication link is configured to allow information about the vehicle to be accessed by the tablet.

4. The article of claim 1, wherein the corresponding program and the plurality of applications execute only on the mobile station.

5. The article of claim 1, wherein the configuring function further comprises the function of:
disabling a first feature of the corresponding program; and
allowing a second feature of the corresponding program to be accessed through the tablet over the communication link.

6. The article of manufacture of claim 1, wherein establishing the communication link between the tablet and the mobile station includes automatically establishing the communication link between the tablet and the mobile station when the tablet is mounted in the vehicle.

7. The article of manufacture of claim 1, wherein the configuring functions further comprising a function of automatically changing screen resolution of the tablet to increase the size of the first program icon after the communication link between the tablet and the mobile station has been established.

8. The article of manufacture of claim 1, wherein the configuring functions further comprise a function of automatically increasing the size of the first program icon on the tablet without changing a screen resolution of the tablet after the communication link between the tablet and the mobile station has been established.

9. The article of manufacture of claim 1, wherein displaying the first and second program icons from the mobile station on the tablet using the communication link includes displaying on the tablet a limited set of all program icons on the tablet, available on the mobile station prior to the communication link between the tablet and the mobile station being established.

10. The article of manufacture of claim 1, wherein the preventing the use of all program icons on the mobile station includes disabling a user interface of the mobile station.

11. The article of manufacture of claim 1, wherein the programming instructions further configure the tablet to link the voice command to a macro to translate the voice command into the predetermined plurality of commands for the respective plurality of applications running on the mobile station.

12. The article of manufacture of claim 11, wherein the programming instructions further include receiving the predetermined plurality of commands in the macro from a user-interface input to the tablet.

13. The article of manufacture of claim 1, wherein the functions further include:
disabling display of text output from at least one application of the plurality of applications related to operation of the vehicle;
converting the text output to speech data, using a text-to-speech converter; and
providing audio output of the speech data at the tablet.

14. A portable telematics system for use in a vehicle, including a tablet and a mobile station, comprising:
a telematics application configured to be automatically activated when the tablet is mounted to the vehicle;
a communication link between the tablet and the mobile station while both are within the vehicle;
an audio output device;
an audio input device;
a display component displaying a program icon from the mobile station related to an operation of the vehicle, on the tablet using the communication link, wherein the mobile station is configured to display a plurality of program icons, including the program icon related to the operation of the vehicle and a program icon not related to the operation of the vehicle and wherein the program icon related to the operation of the vehicle is displayed on the tablet with increased size relative to the program icon not related to the operation of the vehicle; and
a control component configured to :
determine whether the telematics application of the tablet is activated and when the telematics application is activated:
prevent, on the mobile station, use of all program icons on the mobile station including the program icon related to the operation of the vehicle and the program icon not related to the operation of the vehicle; and
allow use of the program icon related to the operation of the vehicle on the tablet, which activates a program, corresponding to the program icon related to the operation of the vehicle, on the mobile station;
receive a voice command via the audio input device;
translate the received voice command into a predetermined plurality of commands for a respective plurality of applications running on the mobile station;

transmit the plurality of commands to the mobile station;
receive output data of the plurality of applications from the mobile station; and
convert text data in the output data from the corresponding program and the plurality of applications into speech data;
wherein the audio output device of the tablet presents an audio output of the speech data.

15. The portable telematics device of claim 14, wherein the control component is configured to be disabled when the vehicle is stopped.

16. The portable telematics device of claim 14, further comprising a second communication link between the tablet and the vehicle,
wherein the second communication link is configured to allow information about the vehicle to be accessed by the tablet.

17. The portable telematics device of claim 14, wherein the corresponding program and the plurality of applications execute only on the mobile station.

18. The portable telematics device of claim 14, wherein the control component is further configured to:
disable a first feature of the corresponding program; and
allow a second feature of the corresponding program to be accessed through the tablet over the communication link.

19. A method comprising:
automatically activating a telematics application on a tablet computer when the tablet is mounted to a vehicle;
controlling a mobile station from the tablet computer using the telematics application, the controlling comprising the steps of:
establishing a communication link between the tablet computer and the mobile station in the vehicle;
displaying a program icon related to the operation of the vehicle from the mobile station, on the tablet computer using the communication link, wherein the mobile station is configured to display a plurality of program icons, including the program icon related to the operation of the vehicle and a program icon not related to the operation of the vehicle and wherein the program icon related to the operation of the vehicle is displayed on the tablet computer with increased size relative to the program icon not related to the operation of the vehicle;
preventing, on the mobile station, use of all program icons including the program icon related to the operation of the vehicle and the program icon not related to the operation of the vehicle, using the communication link;
permitting a use of the program icon related to the operation of the vehicle on the tablet computer using the communication link;
activating a program corresponding to the program icon, related to the operation of the vehicle, on the mobile station using the communication link; and
displaying at least an output of the corresponding program on the tablet computer using the communication link
receiving a voice command;
translating the received voice command into a predetermined plurality of commands for a respective plurality of applications running on the mobile station;
transmitting the plurality of commands to the mobile station;
receiving output data of the plurality of applications from the mobile station;
converting text components of the received output data from the plurality of applications into speech data; and
presenting the speech data as an audio output of the tablet computer.

20. The method of claim 19, further comprising the step of establishing a second communication link between the tablet and the vehicle,
wherein the second communication link is configured to allow information about the vehicle to be accessed by the tablet.

21. The method of claim 19, wherein the program corresponding to the program icon related to the operation of the vehicle and the plurality of applications execute only on the mobile station.

22. The method of claim 19, further comprising the steps of:
disabling a first feature of the corresponding program; and
accessing a second feature of the corresponding program through the tablet, over the communication link.

23. A portable in-vehicle telematics master tablet, including a slave mobile station, comprising:
an audio output device in the master tablet;
an audio input device in the master tablet;
a display device in the master tablet;
a communication link between the master tablet and the slave mobile station in the vehicle; and
a control component on the master tablet configured to:
automatically activate a telematics application of the master tablet when the master tabled is mounted to the vehicle and, when the telematics application is activated:
selectively display a program icon from the slave mobile station and related to an operation of the vehicle, on the master tablet using the communication link, wherein the slave mobile station is configured to display a plurality of program icons corresponding to a plurality of applications running on the mobile device, the plurality of icons including a first program icon related to the operation of the vehicle and a second program icon not related to the operation of the vehicle and wherein the program icon related to the operation of the vehicle is displayed on the tablet with increased size relative to the program icon not related to the operation of the vehicle;
selectively prevent a use of all program icons including the first program icon related to the operation of the vehicle and the second program icon not related to the operation of the vehicle on the slave mobile station using the communication link; and
selectively allow a use of the first program icon related to the operation of the vehicle on the master tablet, which activates a program, corresponding to the first icon related to the operation of the vehicle, on the slave mobile station using the communication link,
wherein the selective allowance further disables at least one feature of the corresponding program using the communication link;
receive a voice command via the audio input device;
translate the received voice command into a predetermined plurality of commands for a respective plurality of applications running on the mobile station and related to the operation of the vehicle;
transmit the plurality of commands to the mobile station;
receive output data of the plurality of applications via the communication link from the mobile station;

convert text components of the received output data from the plurality of applications into speech data; and present the speech data as an audio output of the tablet computer.

24. The portable in-vehicle telematics device of claim 23, wherein the master tablet is at least acting as a telematics device and the slave mobile station is not acting as part of the telematics device.

25. The portable in-vehicle telematics device of claim 23, wherein the slave mobile station comprises one of a laptop, a smart phone, and a tablet.

* * * * *